(12) United States Patent
Takaichi et al.

(10) Patent No.: US 9,446,452 B2
(45) Date of Patent: Sep. 20, 2016

(54) WORKPIECE AND GRIPPING MECHANISM

(75) Inventors: Nakaya Takaichi, Tokyo (JP); Hiroshi Kasuya, Saitama (JP)

(73) Assignees: Citizen Holdings Co., Ltd., Tokyo (JP); Citizen Machinery Co., Ltd, Nagano (JP)

( * ) Notice: Subject to any disclaimer, the term of this patent is extended or adjusted under 35 U.S.C. 154(b) by 1196 days.

(21) Appl. No.: 13/382,386

(22) PCT Filed: Jul. 6, 2010

(86) PCT No.: PCT/JP2010/061471
§ 371 (c)(1),
(2), (4) Date: Mar. 1, 2012

(87) PCT Pub. No.: WO2011/004819
PCT Pub. Date: Jan. 13, 2011

(65) Prior Publication Data
US 2012/0144969 A1    Jun. 14, 2012

(30) Foreign Application Priority Data

Jul. 9, 2009    (JP) .................................. 2009-162709
Mar. 24, 2010   (JP) .................................. 2010-067961

(51) Int. Cl.
| B23B 31/16 | (2006.01) |
| B22C 9/22 | (2006.01) |
| B23B 1/00 | (2006.01) |

(52) U.S. Cl.
CPC ........... *B23B 31/16275* (2013.01); *B22C 9/22* (2013.01); *B23B 1/00* (2013.01);
(Continued)

(58) Field of Classification Search
CPC ...... B26D 7/06; B26D 7/0633; Y10T 83/04; Y10T 83/0505; Y10T 83/051; Y10T 83/0524; B23B 1/00; B23B 31/16275

USPC ............................................................. 83/13
See application file for complete search history.

(56) References Cited

U.S. PATENT DOCUMENTS 4,203,456 A * 5/1980 Miller ........................... 131/230
5,950,517 A * 9/1999 Yoder ................... B27B 29/085
                                                    144/250.24
(Continued)

FOREIGN PATENT DOCUMENTS

| JP | 53-24183 | 3/1878 |
| JP | 5324183 A | 3/1978 |

(Continued)

OTHER PUBLICATIONS

Extended European Search Report from the European Patent Office, dated Sep. 27, 2013. Ref. No. 54.268-4 EP for Application No. 10797130.1-1709 / 2452768 PCT/JP2010061471.

*Primary Examiner* — Jason Daniel Prone
*Assistant Examiner* — Richard Crosby, Jr.
(74) *Attorney, Agent, or Firm* — Howson & Howson LLP

(57) ABSTRACT

There are provided a workpiece and a gripping mechanism capable of shortening the handling time not involved in machining, shortening the overall time required for producing a plurality of finished members, accurately positioning the workpiece even if there is an axial dimension error, lessening waste of a material and reducing the burden of disposal of discharged chips. The workpiece has a shape in which plural raw blanks that become products by material removal are integrally molded. The gripping mechanism comprises a free moving means that relatively and freely moves a gripper and the workpiece, and a positioning means for defining the axial gripping position of the gripper and the workpiece.

14 Claims, 21 Drawing Sheets

(52) U.S. Cl.
CPC ........... *B23B 2270/16* (2013.01); *Y10T 83/04* (2015.04); *Y10T 279/17042* (2015.01); *Y10T 428/15* (2015.01); *Y10T 428/24331* (2015.01); *Y10T 428/24612* (2015.01)

(56) References Cited

U.S. PATENT DOCUMENTS

| | | |
|---|---|---|
| 6,665,579 B2 | 12/2003 | Sasaki et al. |
| 9,056,355 B2 * | 6/2015 | Kazama .................... B23B 1/00 |
| 2005/0217443 A1* | 10/2005 | Matteis .......................... 83/113 |
| 2011/0232435 A1* | 9/2011 | Jaynes .............................. 83/13 |

FOREIGN PATENT DOCUMENTS

| | | | | |
|---|---|---|---|---|
| JP | 6164908 | U | | 5/1986 |
| JP | 62-188629 | | | 8/1987 |
| JP | 62188629 | A | * | 8/1987 |
| JP | 442305 | U | | 4/1992 |
| JP | H11-262805 | A | | 9/1999 |
| JP | 2003260722 | A | | 9/2003 |
| JP | 3954965 | B2 | | 8/2007 |

* cited by examiner

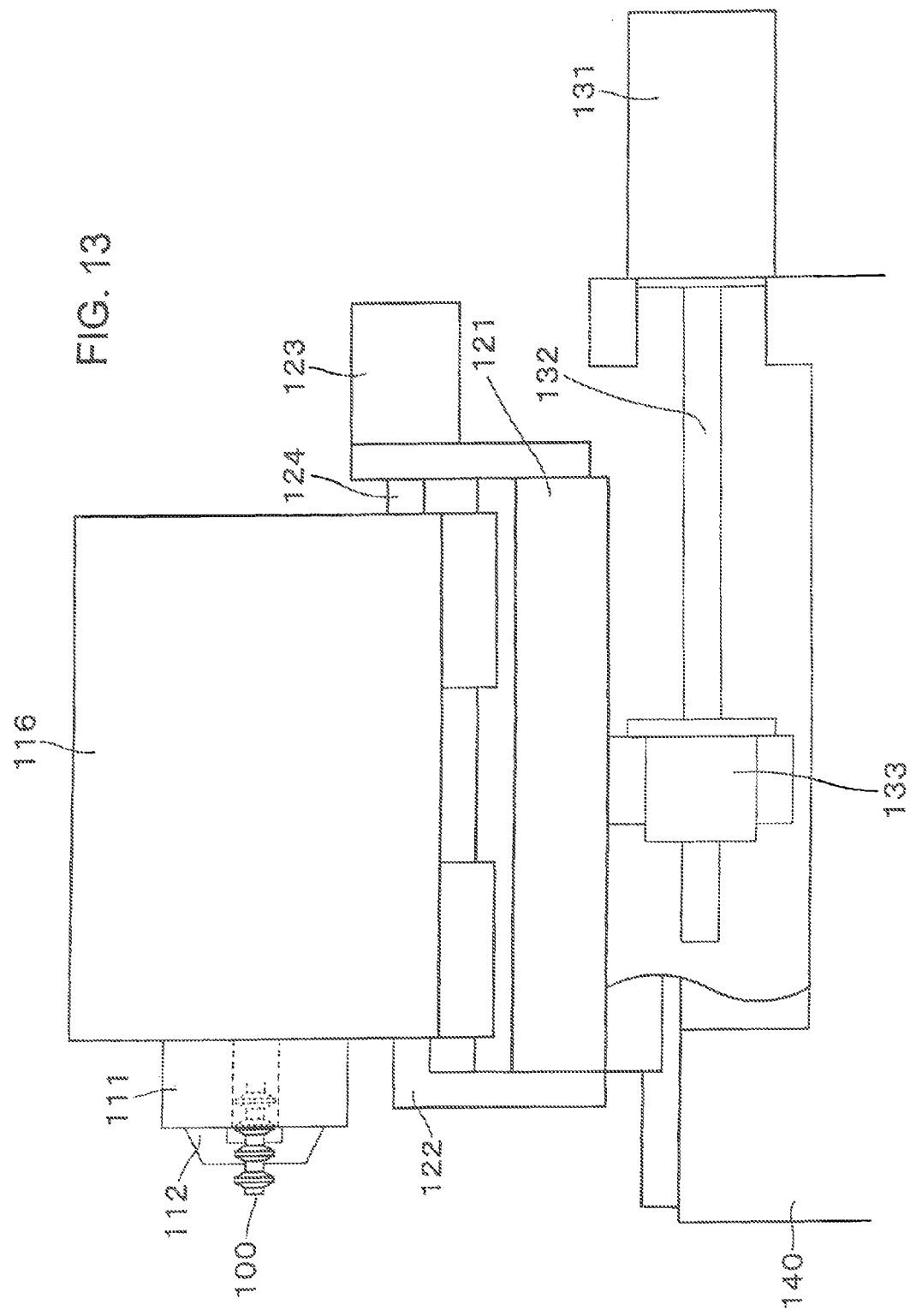

WORKPIECE AND GRIPPING MECHANISM

TECHNICAL FIELD

The present invention relates to a workpiece and a gripping mechanism.

BACKGROUND ART

Hitherto, it has been a widely and commonly used technology to grip a workpiece by means of a gripping mechanism, and to produce products by removing material from a part of the workpiece. Various technologies are known to facilitate positioning in gripping of the workpiece, and to shorten production time.

When a part, such as the part shown in FIG. 3, is to be produced as a product 550 for example, it is known to use a long round bar as a workpiece 500 as shown in FIG. 16 to produce a plurality of products 550. It is possible to produce the plurality of products 550 consecutively by setting the workpiece 500 once, repeating the cutting, i.e., material removing, steps, separating parts of the workpiece 500 while gripping the workpiece by means of a gripping mechanism provided on the spindle of an automatic lathe, and sequentially feeding and then positioning the workpiece 500. The positioning, of the workpiece is carried out each time a product is completed by feeding the workpiece so that an end thereof abuts a positioning stop, and by gripping the workpiece at that position, as described in the specification and drawings of Japanese Patent No. 3954965, for example.

As shown in FIGS. 17 and 18, it is also known to produce a product 550 by first forming a raw blank 501 having an external shape slightly larger than, but analogous to, the outer shape of the product 550, and then repeatedly removing material while gripping each raw blank individually and sequentially by means of a gripping mechanism provided on the spindle of an automatic lathe.

SUMMARY OF THE INVENTION

Problems to be Solved by the Invention

When a long, round bar is used as a workpiece 500, and the material-removing and separating steps are repeated while sequentially feeding the rod in an automatic lathe as in the first example described above, there are two problems. First, a large amount of material 509 needs to be removed by cutting as shown in FIG. 16. Second, there is increased waste of material increases, and a need for disposal of large amounts of discharged chips. Another problem is that, because a large amount of material 509 must be removed by cutting, production time for each product is prolonged, power consumption increases, and machining tools and machines wear out, and their useful lives are shortened.

Moreover, in the second example described above, when cutting is carried out on a raw blank 501 having an outer shape slightly larger than, but analogous to, the outer shape of the final product 550, there is the problem that the raw blanks must be attached to and removed from the machine one by one. Even though the second example solves problems of the first example to some degree, the time required to produce the plurality of products 550 is increased by the attachment and removal steps, and, in some cases, the time required to produce the products becomes longer than in the first example.

In order to solve these problems, the inventor of the present invention has found that it becomes possible to lessen the waste of material by reducing the size of the parts of each raw blank from which material is to be removed, and thereby decrease the burden of disposing of discharged chips, to increase the useful lives of the cutting tools and the automatic lathe, and to reduce power consumption. The reduction of the size of the parts of the raw blank from which material is to be removed can be accomplished by forming the workpiece as an integrally molded plurality of raw blanks that become products by removal of material therefrom.

However, in the machining of an integrally molded workplace having the shape of a plurality of raw blanks that become products through removal of material, there arises a new problem. Due to errors in the form of the workplace, it becomes difficult to position the workpiece accurately, even if its end is in abutment with a stop. The problem is similar to the problems encountered in the case of using a long round bar, and in the case in which raw blanks having a shape slightly larger than, but analogous to the outer shape of the product to be produced, are attached and removed.

In the machining of an integrally molded workpiece having the shape of a plurality of raw blanks that become products through removal of material, errors in fabrication of the workpiece and errors in the axial dimension of the workpiece caused by thermal deformation and the like, result in the accumulation of aberrations in the position of the workpiece in an axial direction as the raw blanks are fed sequentially.

Accordingly, in the case of an integrally molded workpiece having the shape of a plurality of raw blanks that become products through removal of material, it becomes necessary to leave an extra margin in the workpiece in the axial direction to take axial dimension errors caused by positional aberrations into account. However, leaving an extra margin can limit the advantages achieved by the reduction of the amount of material removed in the machining steps, including the reduction of waste, and easing of the burden of disposal of discharged chips. Still another problem is that the margin of the workpiece can run short, in which case the error becomes so large that it is no longer possible to carry out the machining operation.

Means for Solving the Problems

The following measures are taken in order to solve the aforementioned problems. According to a first aspect of the invention, a workpiece for producing a plurality of products by machining is integrally molded into a shape in which plural raw blanks, that become the products by removal of material in the machining process, are distinguishable from the workpiece as a whole.

According to a second aspect of the invention, each of the raw blanks is integrally formed so as to be aligned in a row while having margins of separation between the respective raw blanks.

According to a third aspect of the invention, each of the raw blanks has a through hole and is integrally formed by being fixed to a rod member that penetrates through the through hole.

According to a fourth aspect of the invention, the removal of material is carried out by a cutting process, and cutting and separating steps are carried out consecutively and sequentially on each raw blank.

According to a fifth aspect of the invention, the respective raw blanks include ones for obtaining products having different shapes.

According to a sixth aspect of the invention, the workpiece has a plurality of integrally formed gripped portions, each gripped portion corresponding to one of the raw blanks of the workpiece. Each gripped portion defines an axial gripping of position for its corresponding raw blank.

According to a seventh aspect of the invention, the gripped portion is composed of each raw blank.

According to an eighth aspect of the invention, the gripped portion is provided at a separation part adjoining each raw blank.

According to a ninth aspect of the invention, the gripped portion is composed of concave and convex parts.

According to a tenth aspect of the invention, the gripped portion is composed of a tapered surface.

According to an eleventh aspect of the invention, the gripped portion closest to the raw blank to be worked is gripped while material is removed from the raw blank being worked.

According to a twelfth aspect of the invention, a gripping mechanism having a gripper for gripping a workpiece in a spindle comprises a free moving means for moving the spindle and the workpiece relatively and freely in an axial direction, and a positioning means for positioning the workpiece and the spindle at predetermined relative positions in the axial direction. The positioning means is arranged so that, the workpiece is gripped by the gripper, when the spindle and the workpiece are moved relatively by the free moving means and so that the workpiece can be gripped by the gripper when the spindle and the workpiece are positioned.

According to a thirteenth aspect of the invention, the positioning means freely moves one of the spindle and the workpiece in the axial direction while fixing the other one.

According to a fourteenth aspect of the invention, the gripping mechanism further comprises a feed moving means for work-feeding the spindle in the axial direction, wherein the feed-moving means is used also as the free moving means as drive and fixation thereof is released in gripping the workpiece by the gripper.

According to a fifteenth aspect of the invention, the positioning means is composed of a tapered surface provided at least at one of the gripped portion of the gripper and the workpiece.

Advantageous Effects

According to the workpiece of the first aspect of the invention, because the workpiece has a shape in which the raw blanks that become products by material removal are integrally molded, and the removable material parts can be reduced, it becomes possible to lessen waste of the material, to reduce the burden of disposal of discharged chips, and to shorten the work time per product. Furthermore, the load applied to the working tools and machines is reduced, power consumption is reduced, and the useful lives of the tools and machines are improved.

Furthermore, because it becomes possible to repeat the material removing and separating operations by sequentially feeding the workpiece in a manner similar to the manner in which a rod member such as a standard round bar is machined, it is possible to shorten the handling time not involved in the machining, and to shorten the overall time required for producing the plurality of products.

According to the workpiece of the second aspect of the invention, the workpiece itself can be easily manufactured and the time required for producing the plurality of products can be shortened further. According to the workpiece of the third aspect of the invention, because the respective raw blanks are integrally formed by being fixed to the rod member, the workplace can be formed as a rigid bar member regardless of the material of the raw blank, and the workpiece can be readily manufactured from raw blanks composed of various materials.

According to the workpiece of the fourth aspect of the invention, the invention exhibits the advantageous effects further in a machining operation carried out by an automatic lathe. According to the workpiece of the fifth aspect of the invention, it is possible to machine parts consecutively, without prolonging the overall required time, even if the workpiece includes products having different shapes.

According to the workpiece of the sixth aspect of the invention, because gripped portions that define the axial gripping positions of the raw blanks are integrally formed and correspond to the plurality of raw blanks, the workpiece, which is sequentially fed after the material removing and separating operations on each raw blank, is positioned with respect to the spindle, and a positioning error is absorbed every time a raw blank is fed and the gripped portion is gripped by the gripper of the spindle. Therefore, there is no accumulation of dimension errors in the axial direction, that would otherwise be caused by errors in fabricating the workpiece, by thermal deformation and other causes. Accordingly, it becomes possible to achieve a further reduction of the amount of removable material, to reduce waste of material, to reduce the burden of disposal of discharged chips, and to prevent the formation of unworkable parts as a result of accumulation of dimension errors.

According to the workpiece of the seventh through tenth aspects of the invention, the gripped portion can be configured easily. According to the workpiece of the eleventh aspect of the invention, it becomes possible to shorten the distance between the gripped portion and the worked part and to work accurately with less error.

According to the gripping mechanism of the twelfth aspect of the invention, because, in gripping the workpiece by the gripper, the positioning means is arranged to move the spindle and the workpiece relatively and freely by the free moving means, and, as the spindle and the workpiece are positioned, the workpiece is gripped by the gripper at a predetermined axial position set in advance, it is possible to absorb even a form error by the free moving means and to grip the workpiece by positioning the spindle and the workpiece properly.

Furthermore, because it is possible to absorb errors and to position each raw blank every time a raw blank is fed in the case of working a bar-like workpiece in which plural raw blanks are integrated, accumulation of axial dimension errors caused by form errors, thermal deformation, and the like, is minimized. As a result, it becomes possible to reduce the size of the material-removal part of the workpiece, to lessen the waste of the material, and to reduce the burden of disposal of discharged chips. It also becomes possible to prevent unworkable parts from being otherwise caused by the accumulation of the dimension errors, and to shorten the overall time required for producing a plurality of products.

According to the gripping mechanism of the thirteenth and fourteenth aspects of the invention, the free moving means can be configured with a simple structure. According to the gripping mechanism of the fifteenth aspect of the invention, it becomes possible to configure the gripper and the positioning section integrally with a simple structure, and to effect positioning while carrying out the gripping operation.

BRIEF DESCRIPTION OF THE DRAWINGS

FIG. 13 is a side view of the gripping mechanism shown in FIG. 11 after positioning the workplace;

BEST MODES FOR CARRYING OUT THE INVENTION

Figure 1:
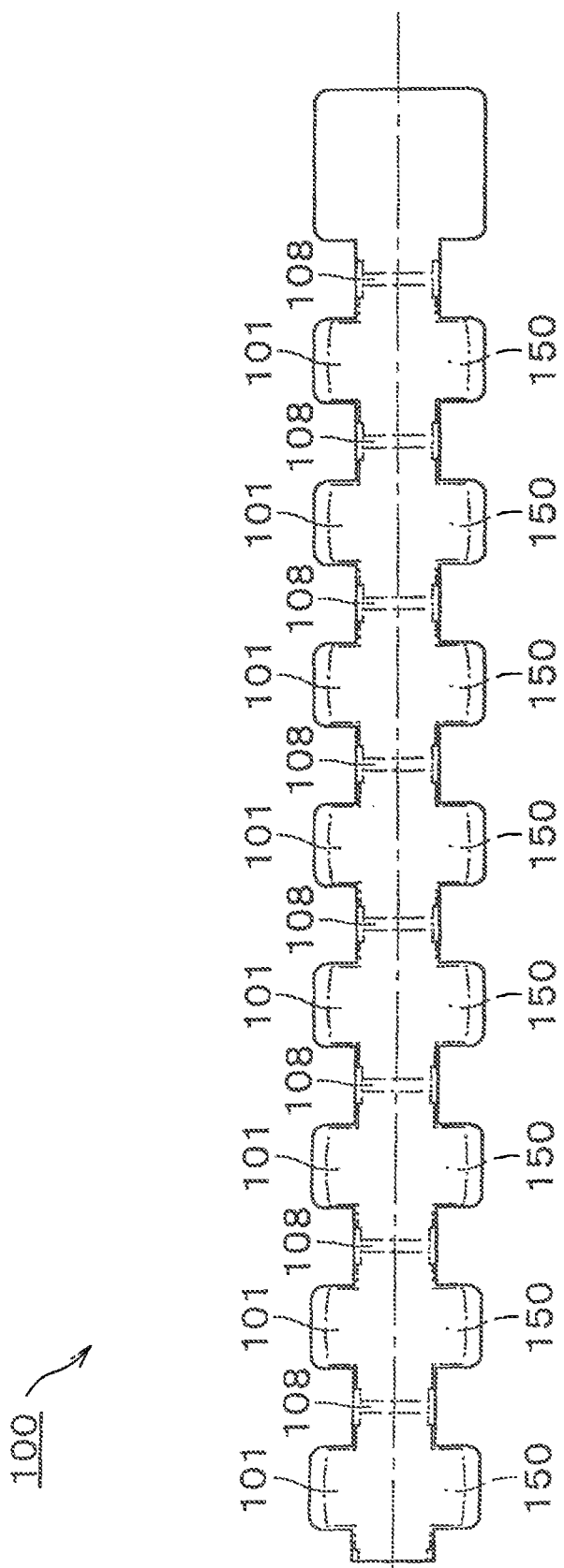
FIG. 1 is a side view of a workpiece of a first embodiment of the invention.
Figure 2:
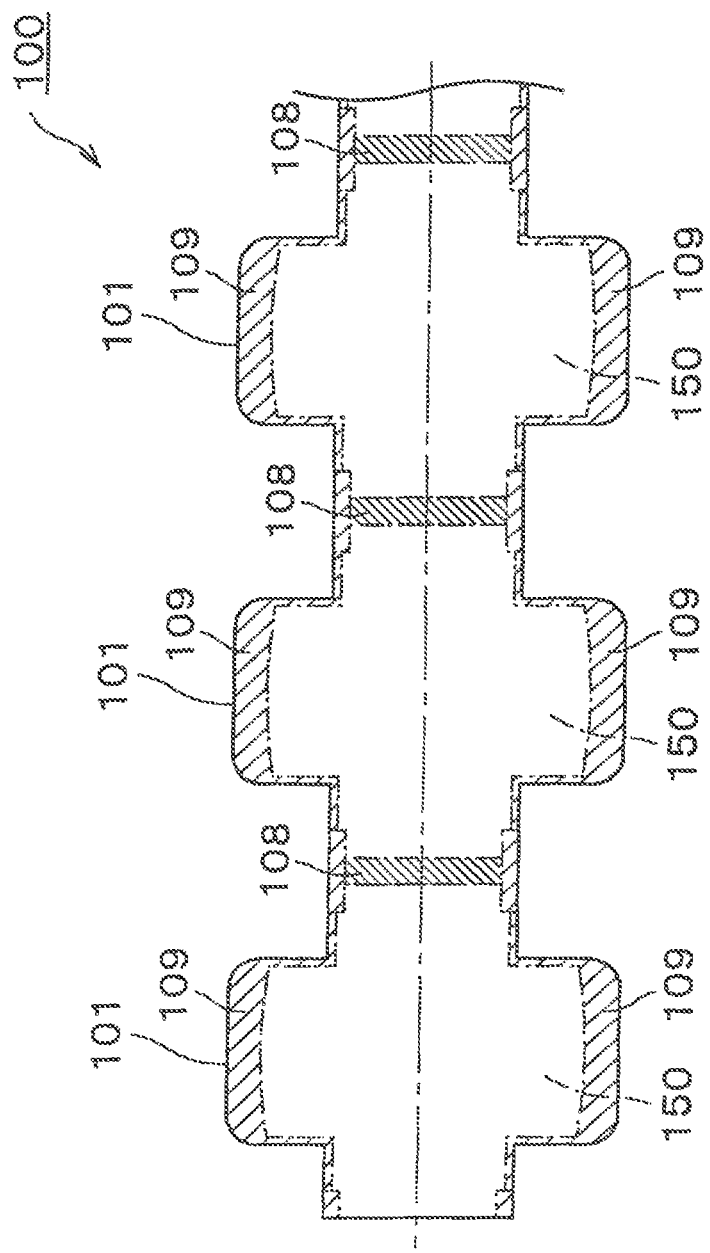
FIG. 2 is an enlarged explanatory drawing of an edge portion of the workpiece shown in FIG. 1.

First, a workpiece 100 of a first embodiment of the invention will be explained. As shown in FIGS. 1 and 2, the workpiece 100 is composed of a plurality of raw blanks 101, aligned in a row and integrally formed of one material, with interposed margins of separation 108 between them.

Figure 3:
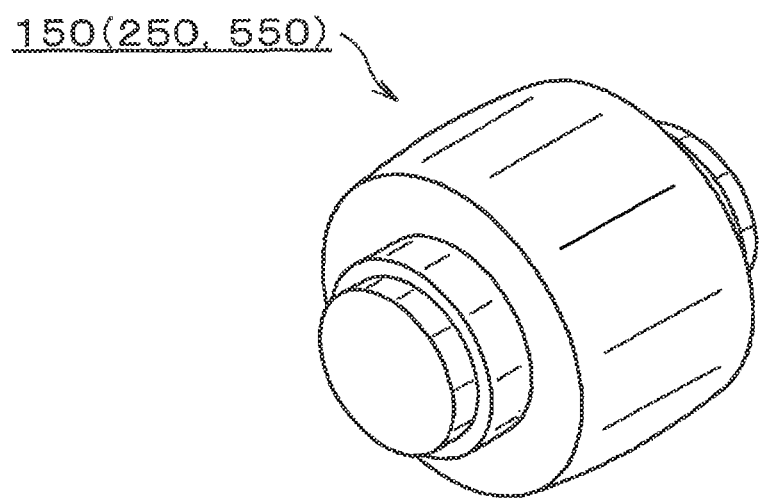
FIG. 3 is a perspective view of a product.

Each raw blank 101 is surrounded by a required removable material part 109 so that the raw blank becomes a single product by a material removing step such as a cutting step, and has a shape analogous to the outer shape of the product 150 as shown in FIG. 3. It should be noted that the product can be a finished product on which all machining has been completed, or a semi-finished product which requires a secondary machining step.

The workpiece 100 can be integrally molded by casting or forging, or can be molded by means of plastic working such as press working, as long as its material is a metallic material. The raw blank can also be formed by another working process such as the simultaneous bonding of plural metal components. Furthermore, if the material is a resin material, a ceramic, sintered metal, or the like, the workpiece 100 can be molded integrally by the use of dies and the like, by injection molding, or by press molding. The workpiece 100 can be composed of individual raw blanks that are integrally molded by various steps such as soldering, bonding, press-fitting, caulking, pressure-welding, pressure-joining and the like.

Furthermore, although in the examples mentioned above identical products 150 are produced by forming all of the raw blanks 101 into the same shape, the workpiece may be composed of raw blanks having different shapes, but aligned in a row with margins of separation, in which case the products produced can have different shapes.

Figure 4:
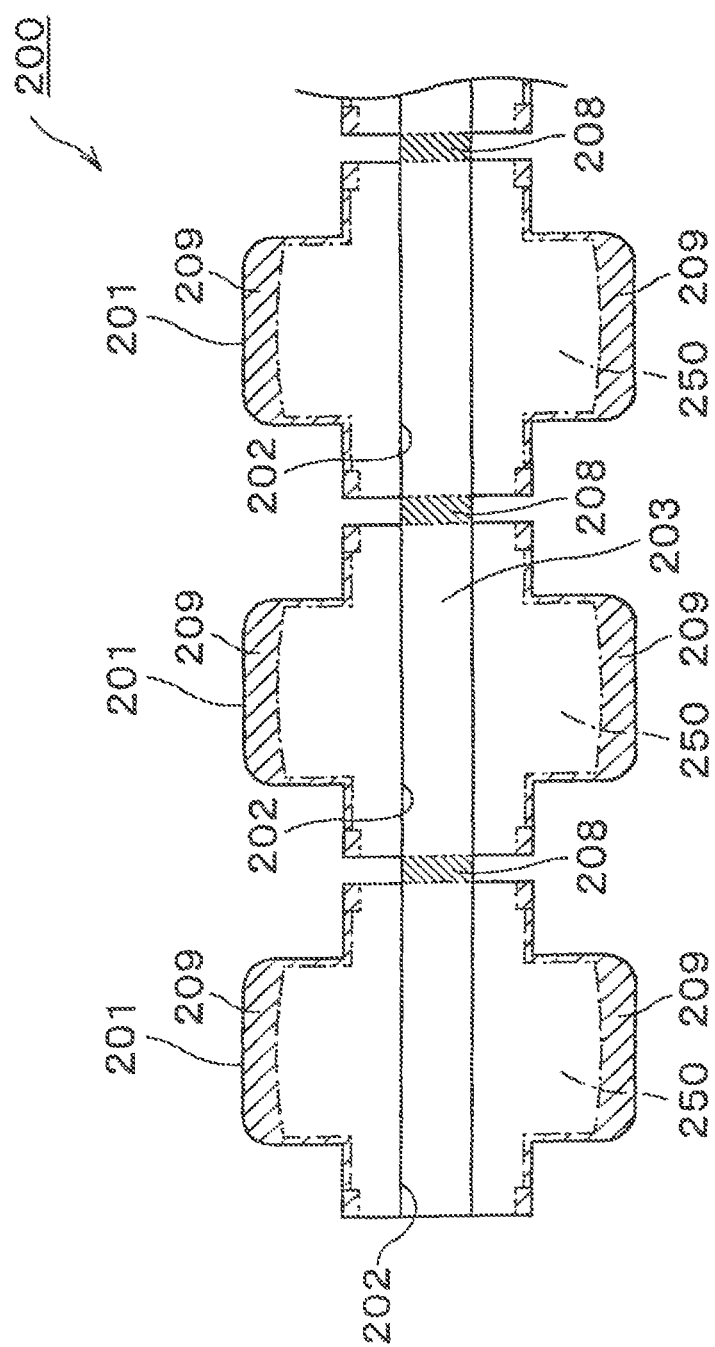
FIG. 4 is an enlarged side view of a workpiece of a second embodiment of the invention.

As shown in FIG. 4, a workpiece 200 of a second embodiment of the invention is fabricated from a plurality of raw blanks 201, each having a through hole 202. The raw blanks are is integrally aligned in a row, with margins of separation between them, by fitting and fixing the raw blanks to a through rod 203. The outer shape of each raw blank 201 includes a required removable material part 209, and analogous to the outer shape of the product 250 shown in FIG. 3, as in the case of the first embodiment described above.

The through rod 203 may be composed of a material that is either the same as, or different from, the material of the raw blank 201, as long as the rod is a rigid body having a level of rigidity such that it is capable of maintaining accuracy during material removing steps. When the raw blank is formed of a material having a low rigidity, such as resin in particular, it becomes possible to enhance the rigidity of the workpiece 200 as a whole by virtue of the rigidity of the through rod 203, and thereby not only facilitate handling of the workpiece, but also improve the accuracy of the material removal.

The through rod 203 can be fixed to the through holes 202 by any means suitable to prevent problems from occurring during the material removal. Suitable means for fixing the rod to the through holes include press-fitting, or implanting the through rod 203 into the through hole 202 and fixing it by welding or bonding. It should be noted that the through rod 203 may be used as a core bar as part of the product, or it may be pulled out by providing a suitable process for removing the through rod 203 from the through hole 202 after completion of the material removal.

Furthermore, where plural raw blanks 201, each having a through hole 202, are aligned in a row tightly with one another, and are fitted and fixed to the through rod 203, they can be integrally formed. In this case, although the separation is not carried out by machining, and the workpiece 200 has to be handled in a condition in which the plural products 250 are integrally formed even after the removal of material from all of the raw blanks 201 has been completed, it is possible to shorten production time by eliminating individual separating steps, and removing the through rod 203 from the through holes 202 all at once, rather than removing the through rod 203 by cutting it once for each individual product 250.

Figure 5:
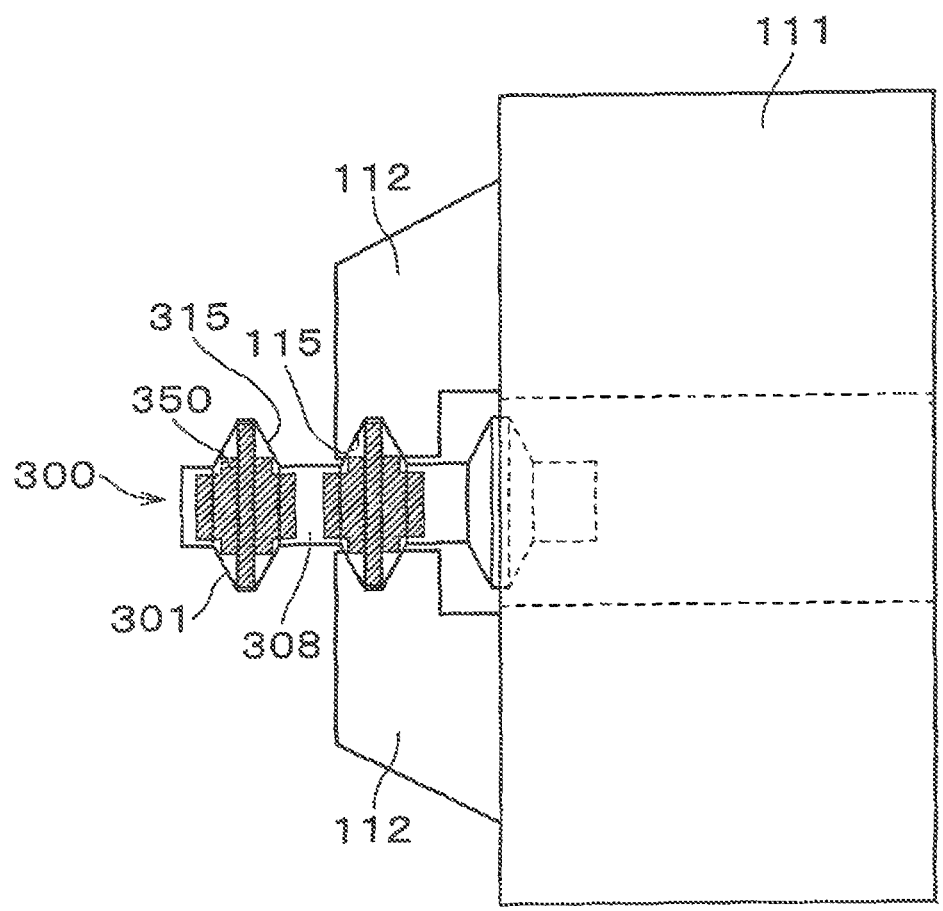
FIG. 5 is an explanatory drawing of a workpiece of a third embodiment and a gripping mechanism of the invention.

As shown in FIG. 5, a workpiece 300, of a third embodiment of the invention, is fabricated in such a way that plural raw blanks 301 are aligned in a row with margins of separation 308 between them, and are integrally formed of a single material.

Each raw blank 301 is surrounded by a required removable material part so that it becomes one product 350 by a material removing operation such as a cutting operation. Its outer shape is convex in cross-section, having tapered surfaces both axially in front of, and axially behind, an apex. The tapered surfaces of each raw blank 301 form a gripping surface 315, i.e., a gripped portion, to be gripped by a gripper 112 provided in front of a spindle 111. (Both the gripper and the spindle are described in detail later.)

Figure 6:
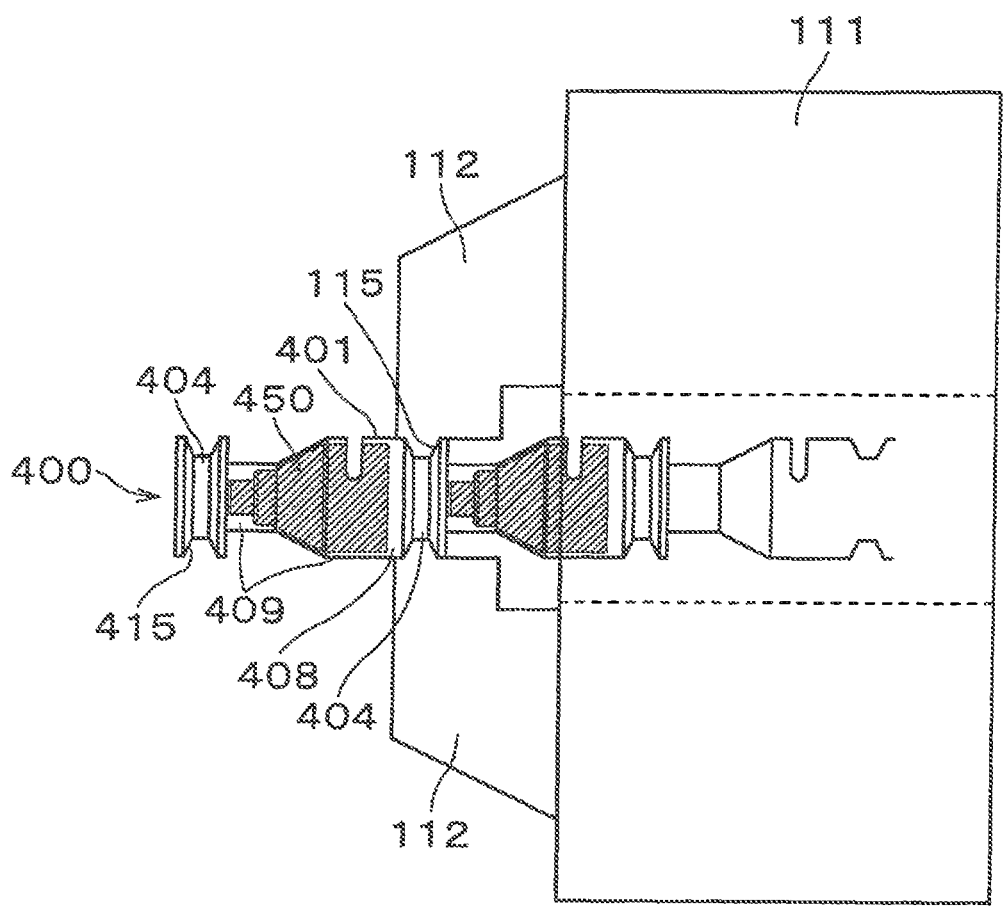
FIG. 6 is an explanatory drawing of a workpiece of a fourth embodiment and a gripping mechanism of the invention.

As shown in FIG. 6, a workpiece 400, of a fourth embodiment of the invention, is fabricated in such a way that plural raw blanks 401 are aligned in a row with margins of separation 408 and gripping bosses 404 between them, and are integrally formed by a single material.

Each raw blank 401 is surrounded by a required removable material part 409 so that it becomes one product 450 by a removing operation such as a cutting operation. The gripping boss 404 is provided integrally with the margin of separation 408 adjoining each raw blank 401. The gripping boss 404 is formed into a concave shape in cross-section, having axially spaced front and rear tapered surfaces. Thus, the respective gripping surfaces 404 are configured to be gripped by a gripper 112. It should be noted that, although the gripping surfaces 404 are depicted as tapered grooves in FIG. 6, as long as the gripped portions are projecting bosses, the shape of the gripped portions 404 is not limited to a tapered groove.

Figure 7:
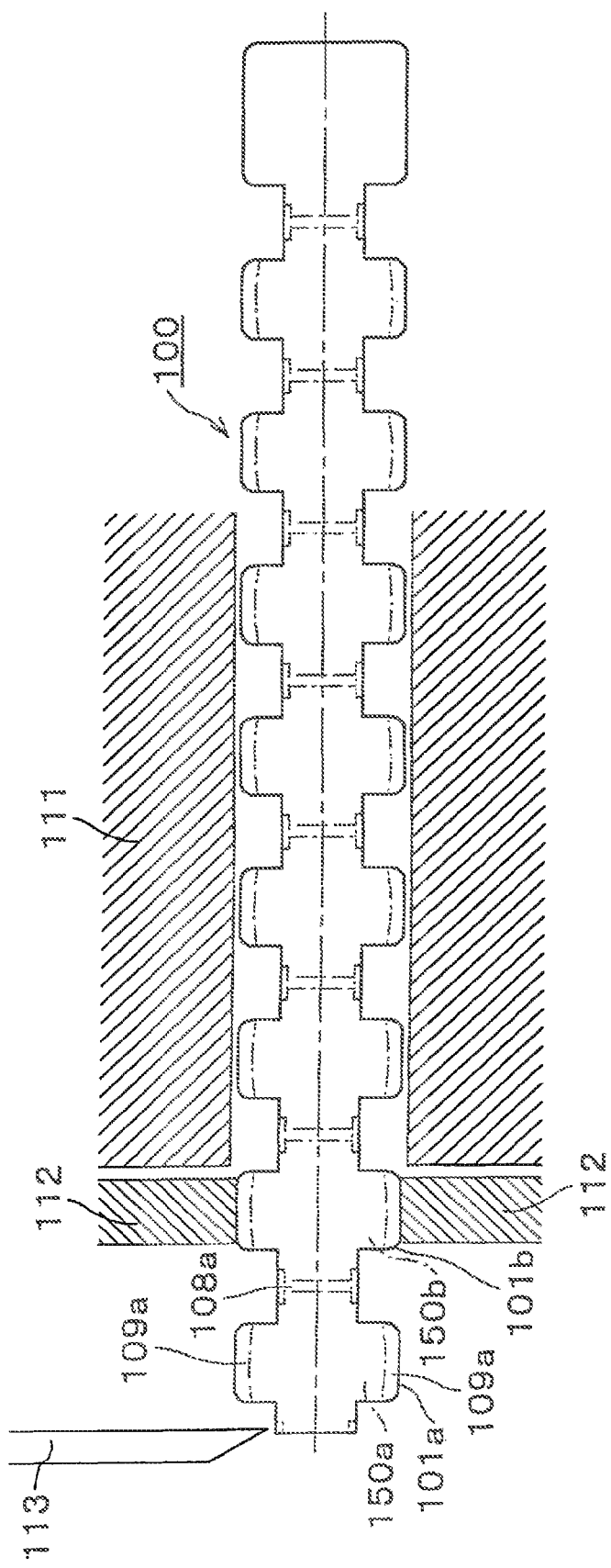
FIG. 7 is an explanatory drawing illustrating the machining of the outer shape of the workpiece of the first embodiment shown in FIG. 1.

Next, the operations in machining of the workpieces of the invention by means of a standard automatic lathe will be explained with reference to workpiece 100 as an example. First, as shown in FIG. 7, the workpiece 100 is inserted into the spindle 111 of an automatic lathe from the right side in the drawing, and is fixed and gripped at a position on the left side in the drawing by a gripper 112 provided on the spindle 111, so that a raw blank 101a at an end of the workpiece projects to a working position in front of the gripper 112 on the left side of the drawing. As raw blank 101a is being machined, the workpiece is gripped at a grippable portion associated with raw blank 101a, which, in this case is the outer surface of the adjacent raw blank, 101b.

Figure 8:
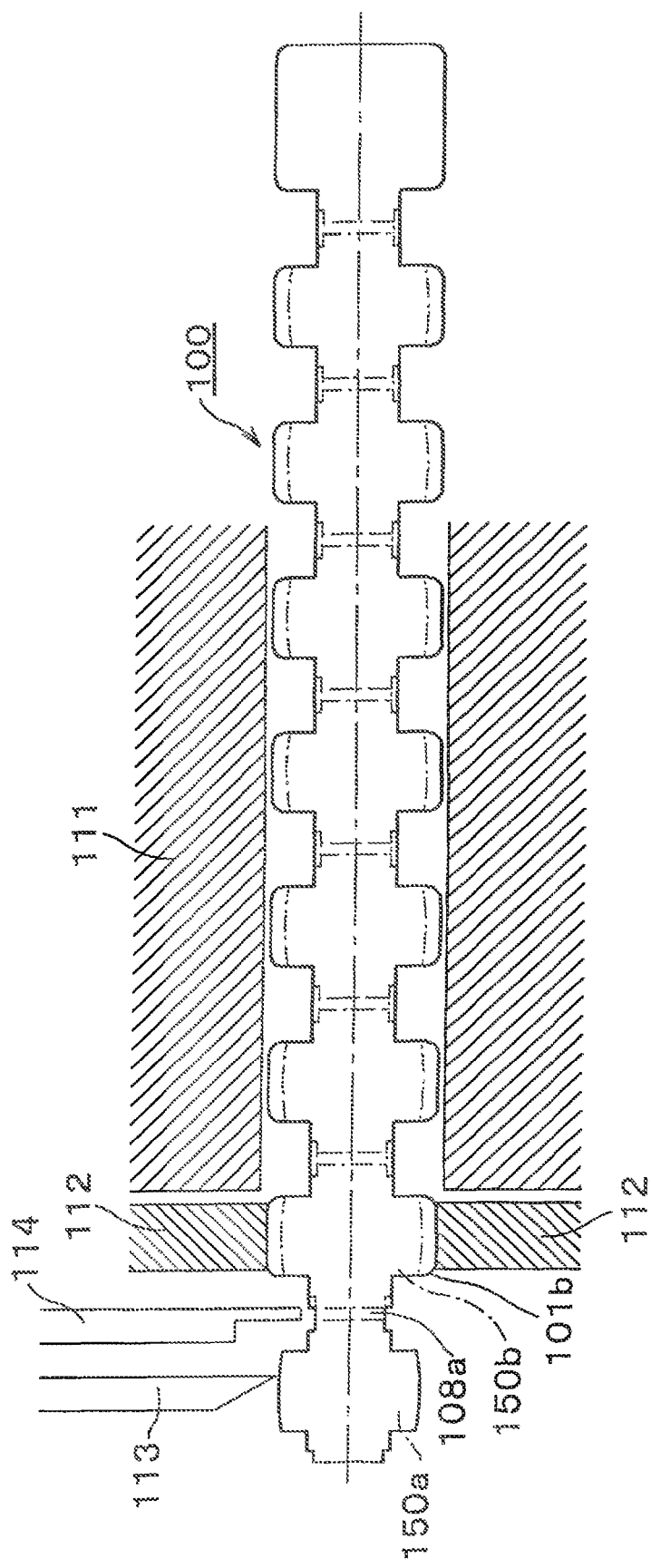
FIG. 8 is an explanatory drawing showing the outer shape of the workpiece of the first embodiment shown in FIG. 1 after machining.

When the spindle 111 is rotated together with the gripper 112, the workplace 100 rotates about its central axis, and the removable material part 109a of the raw blank 101a is cut away by a cutting tool 113 of the automatic lathe. Then, the raw blank 101a takes the form of the product 150a, although the margin of separation 108a is still intact as shown in FIG. 8.

Figure 9:
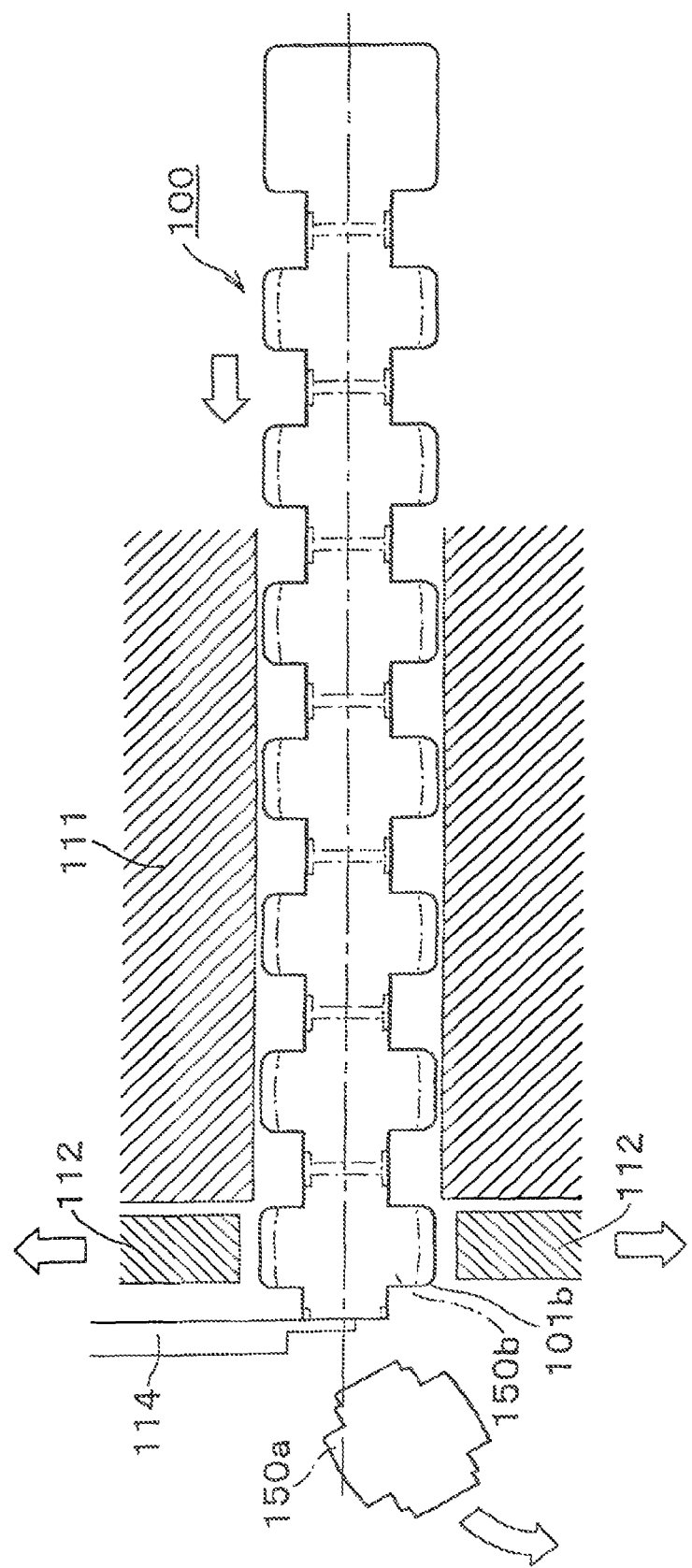
FIG. 9 is an explanatory drawing showing the separation of a product from the workpiece of the first embodiment shown in FIG. 1.

Next, as shown in FIG. 9, a separating tool 114 working on the margin of separation 108a, separates the product 150a from the workplace 100, thus completing the work. The separating tool 114 is then set back, the gripper 112 is opened, and the workplace 100 is fed forward.

Figure 10:
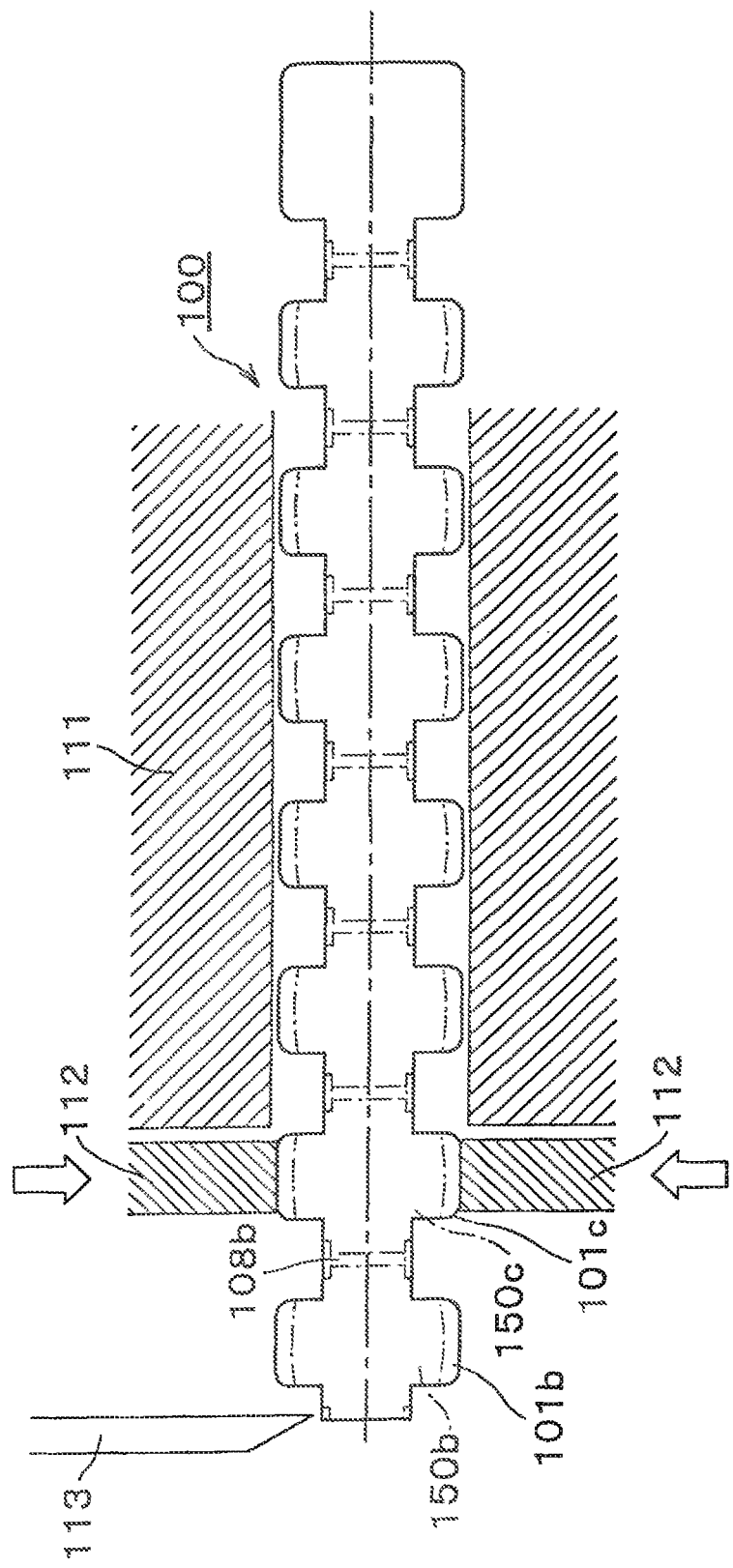
FIG. 10 is an explanatory drawing illustrating the machining of a second raw blank after feeding the workpiece of the first embodiment shown in FIG. 1.

Then, as shown in FIG. 10, the workpiece 100 is fixed in a condition in which a next raw blank 101b to be machined projects out to the working position in front of the gripper 112. The gripper 112 grips the workpiece at the outer surface of raw blank 101c, which is the grippable portion associated with raw blank 101b. Then, machining of the raw blank 101b is commenced.

By repeating the above-described processes, it becomes possible to machine the plurality of raw blanks 101 consecutively by supplying the workpiece 100 once to the automatic lathe, to produce a plurality of products 150, to shorten the handling time not involved in machining and to shorten the overall production time.

Furthermore, it becomes possible to reduce waste of the material, to reduce the burden of disposal of discharged chips, and to shorten the working time per unit product. Furthermore, it becomes possible to reduce wear of the cutting tools and the automatic lathe, to reduce power consumption, and to improve the useful lives of the tools and the machinery.

It should be noted that although an operation in which the workplace 100 is machined by an automatic lathe has been explained above, any machine tool such as a press, a laser machine, a grinding machine, or the like can be used as long as the machine tool is capable of repeating the material removing and separating steps on the workplace while sequentially feeding the workpiece.

Furthermore, the plurality of raw blanks composing the workplace can have a shape other than the round shape as described above, as long as the workplace is configured so that it can be sequentially fed and consecutively machined.

Figure 11:
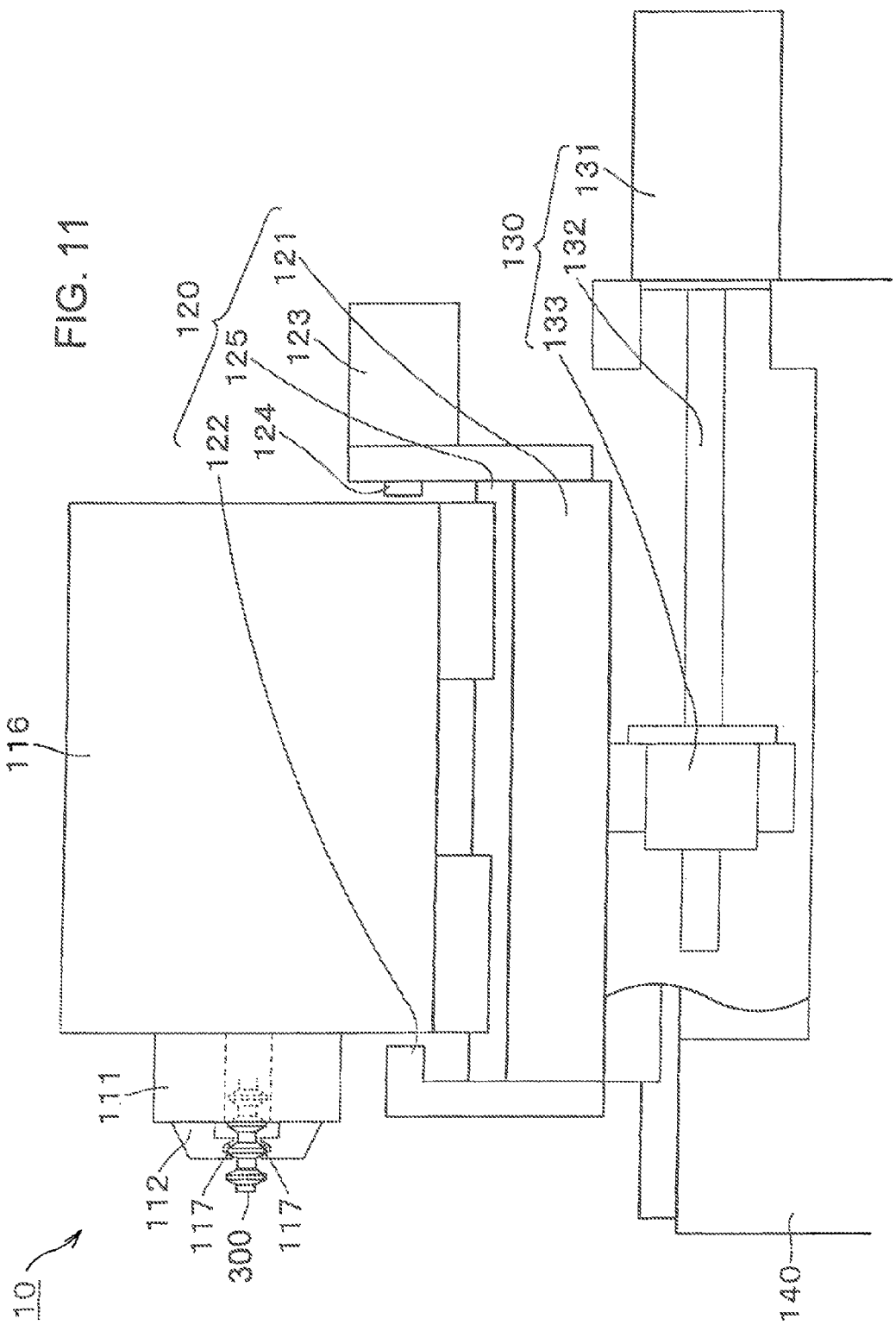
FIG. 11 is a side view of the gripping mechanism of one embodiment of the invention before gripping the workpiece.

FIG. 11 shows a spindle of a machine tool to which one embodiment of the gripping mechanism of the invention is applied, and an example in which the workpiece 300 of the third embodiment of the invention is gripped. The machine tool has a base 140 provided with a ball screw shaft 132, which is rotatably driven by a motor 131 provided on a base 140. A ball nut 133, engaged with the ball screw shaft 132, reciprocates as the ball screw shaft 132 is rotated.

The ball nut 133 is fixed to a slide table 121. Thus the slide table 121 reciprocates along the ball screw shaft 132 as the ball nut 133 reciprocates. The position of the slide table 121 is controlled by a control means, not shown. A rail 125, that extends in the same direction as the axial direction of the ball screw shaft 132 is installed on an upper surface of the slide table 121.

A spindle table 116 supports the spindle 111 rotatably, and is supported by, and freely movable on the rail 125. The spindle 111 is supported so that its axial direction is parallel to the directions in which the ball screw shaft 132 and the rail 125 extend. The rail 125 has a stop 122 that is capable of abutting one end of the spindle table 116. A cylinder 123, mounted on the other end on the slide table 121, is provided with a piston 124 that is capable of abutting the other end of the spindle table 116.

The spindle table 116 is pressed toward the stop 122 side by projection of the piston 124. That is, the spindle table 116 is sandwiched by the stop 122 and the piston 124. The spindle table 116 is fixed at a predetermined position with respect to the slide table 121 by being sandwiched by the stop 122 and the piston 124 When the piston 124 is retracted and the pressure applied by the piston 124 to the spindle table 116 is released, the spindle table 116 can slide freely between the piston 124 and the stop 122.

A free moving means 120, for supporting the spindle 111 for free movement along the axial direction, is composed of the slide table 121, the rail 125, the piston 124, and the stop 122. A feeding means 130, for feeding the spindle 111 along the axial direction, is composed of the motor 131, the ball screw shaft 132 and the ball nut 133. By projection and retraction of the piston 124, the free moving means 120 can switch between holding the spindle 111 at a fixed position and allowing the spindle 111 to slide freely relative to the slide table 121.

The spindle 111 is provided with gripper 112 for gripping the workpiece 300 by its sides. The gripper 112 is composed of a plurality of gripping claws which are axially fixed to the spindle 111, but can advance and set back in the radial direction. Each gripping claw is provided with a concave portion 117 formed at an end thereof. The concave portion 117 has gripping surfaces 115 each formed of axially spaced tapered surfaces. The gripping surfaces 115 (shown in FIG. 5) are configured so as to abut and engage the gripping surfaces 315 of the raw blank 301 with each other.

Figure 12:
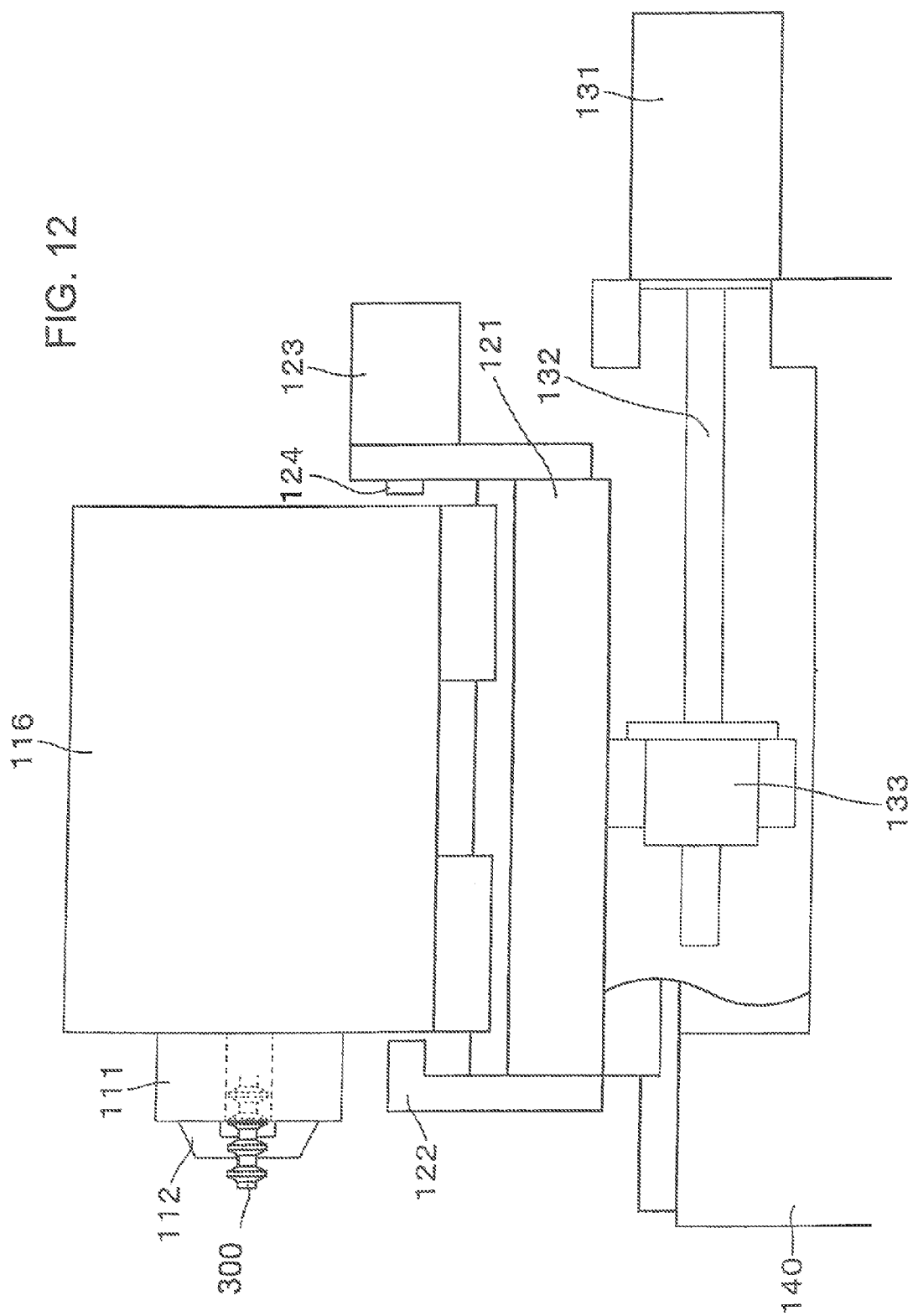
FIG. 12 is a side view of the gripping mechanism shown in FIG. 11 after gripping and before positioning the workplace.

As shown in FIG. 12, the spindle 111 grips the workpiece 300 by sandwiching the gripped portion between the concave portions 117 of each section of the gripper 112. Then, it becomes possible to machine the workpiece 300 gripped by the spindle 111 by positioning and fixing the spindle table 116 (and the spindle 111) with respect to the slide table 121, as shown in FIG. 13, while gripping the workpiece 300 by the spindle 111, and by feeding the work by the feed moving means 130.

Figure 18:
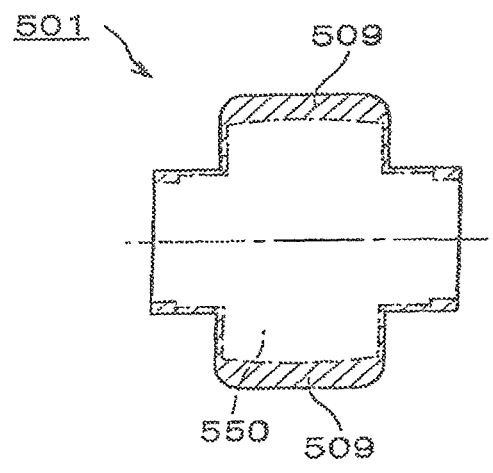
FIG. 18 is an explanatory drawing of a side of the raw blank shown in FIG. 17.

Next, an operation for working the workpiece 300 by the automatic lathe described above will be explained in detail. At first, as shown in FIG. 18A, the workpiece 300 is inserted into the spindle 111 of the automatic lathe from the right side in the drawing so that the workpiece 300 is positioned by abutment of its end against the stop, for example, and so that the endmost raw blank 301a projects to a working position in front of the gripper 112 (on the left side in the drawing). The workpiece 300 is thereby positioned and fixed so that an adjoining raw blank 301b (to the right of raw blank 301a in the drawing) is roughly positioned in relation to the gripper 112. It should be noted that the stop is also used as the separating tool 114 in the present embodiment.

Figure 14A:
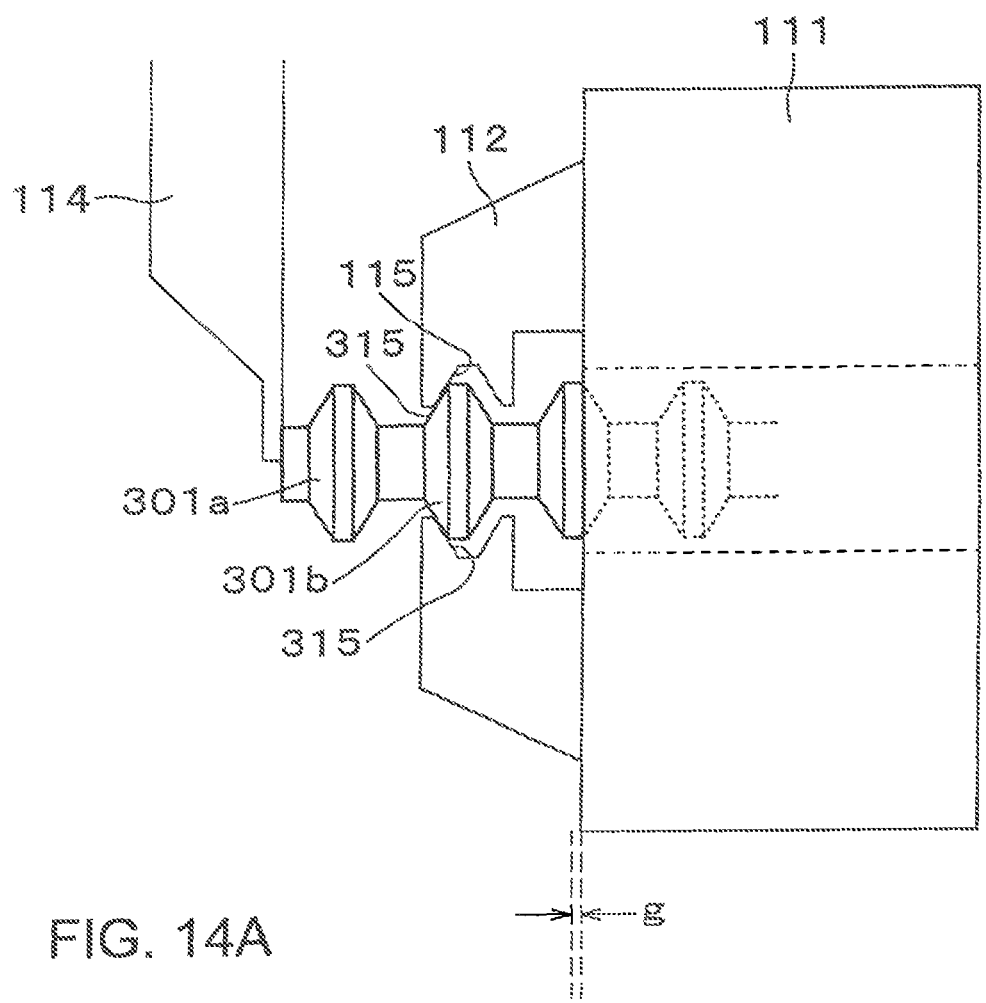
FIG. 14A is an explanatory drawing showing a step in the sequence of operation of the gripping mechanism of the invention.
Figure 14B:
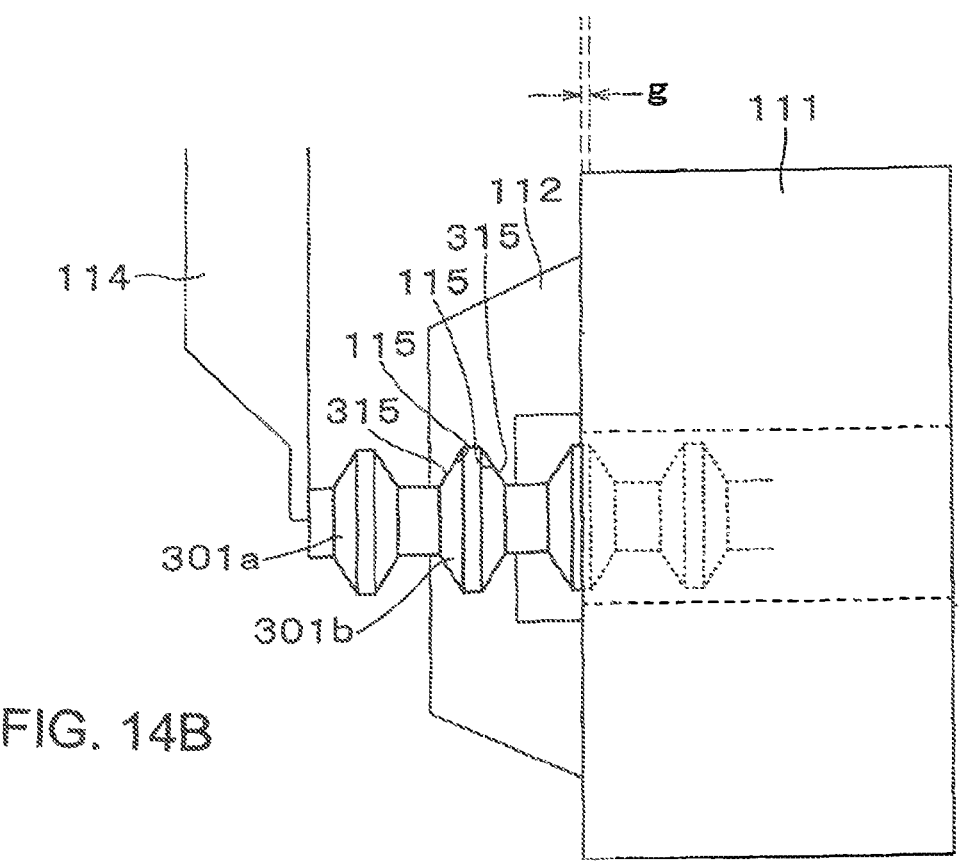
FIG. 14B is an explanatory drawing showing another step in the sequence of operation of the gripping mechanism continued from FIG. 14A.

Then, the raw blank 301b is engaged by the concave portions 117, and the workpiece 300 is gripped, as shown in FIG. 14B, by moving the gripping claws so that they approach each other while the spindle table 116 moves freely with respect to the slide table 121. Here, the spindle 111 (and the spindle table 116) moves freely by a slight distance g in the axial direction in the process of engagement of the raw blank 301b by the concave portions 117, as a gripping surface 115 of the gripper 112 follows the gripping surface 315 of the workpiece 300 as these gripping surfaces 115 and 315 abut each other.

The relative axial positions of the raw blank 301 and the spindle 111 are defined by moving the spindle table 116 in the axial direction so that both gripping surfaces (tapered surfaces) 115 and 315 follow each other. A positioning means for positioning the workpiece 300 at a predetermined position with respect to the spindle 111 in gripping the workpiece 300 by the gripper 112 is configured by the gripping surfaces 115 and 315 in the present embodiment, and the positioning means is provided by the gripper 112 and the workpiece 300.

By the action of the positioning means, any axial dimension error caused by an error in fabricating the workpiece 300, by thermal deformation, or by other causes, is absorbed in the gripping of the workplace 300 by the gripper 112, and relative positioning of the spindle 111 and the workpiece 300 is also completed in the gripping operation.

Figure 14C:
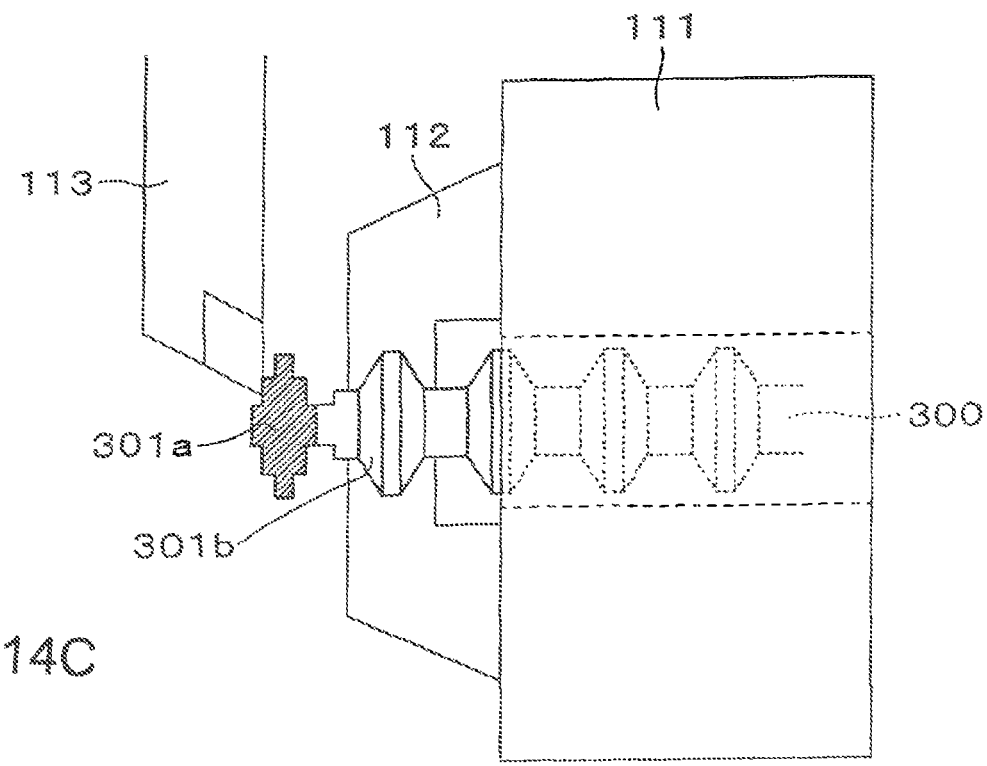
FIG. 14C is an explanatory drawing showing another step in the sequence of operation of the gripping mechanism continued from FIG. 14B.
Figure 14D:
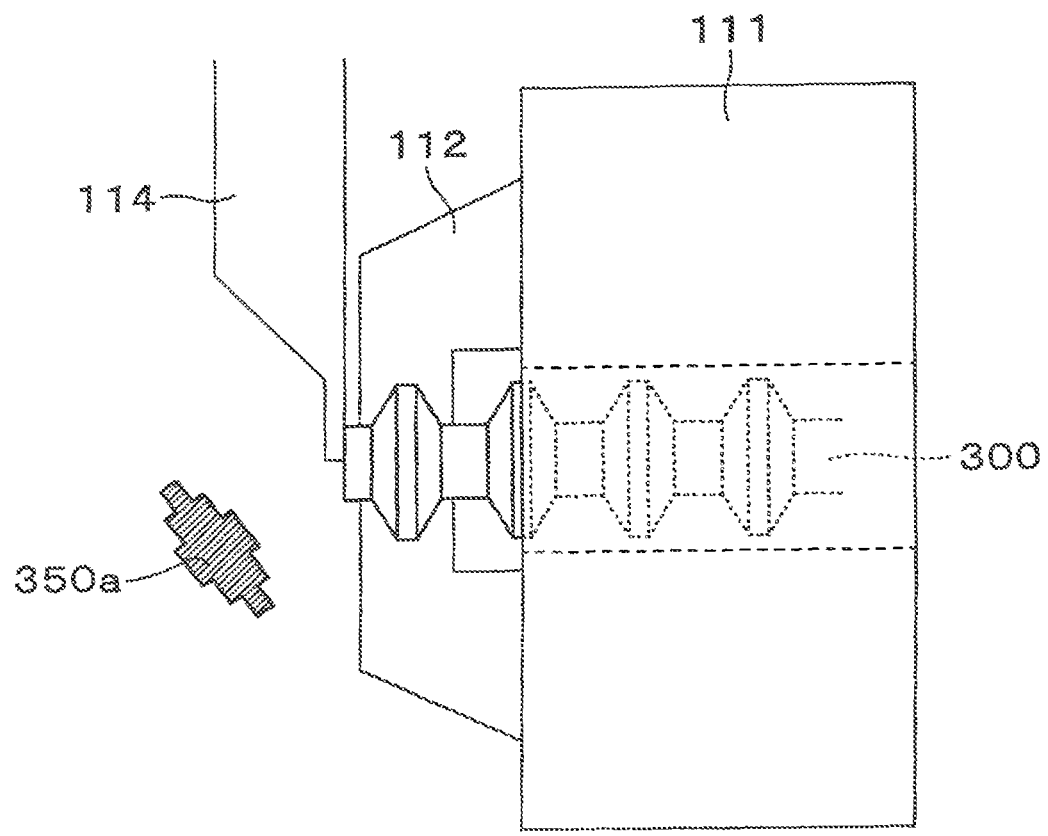
FIG. 14D is an explanatory drawing showing another step in the sequence of operation of the gripping mechanism continued from FIG. 14C.
Figure 14E:
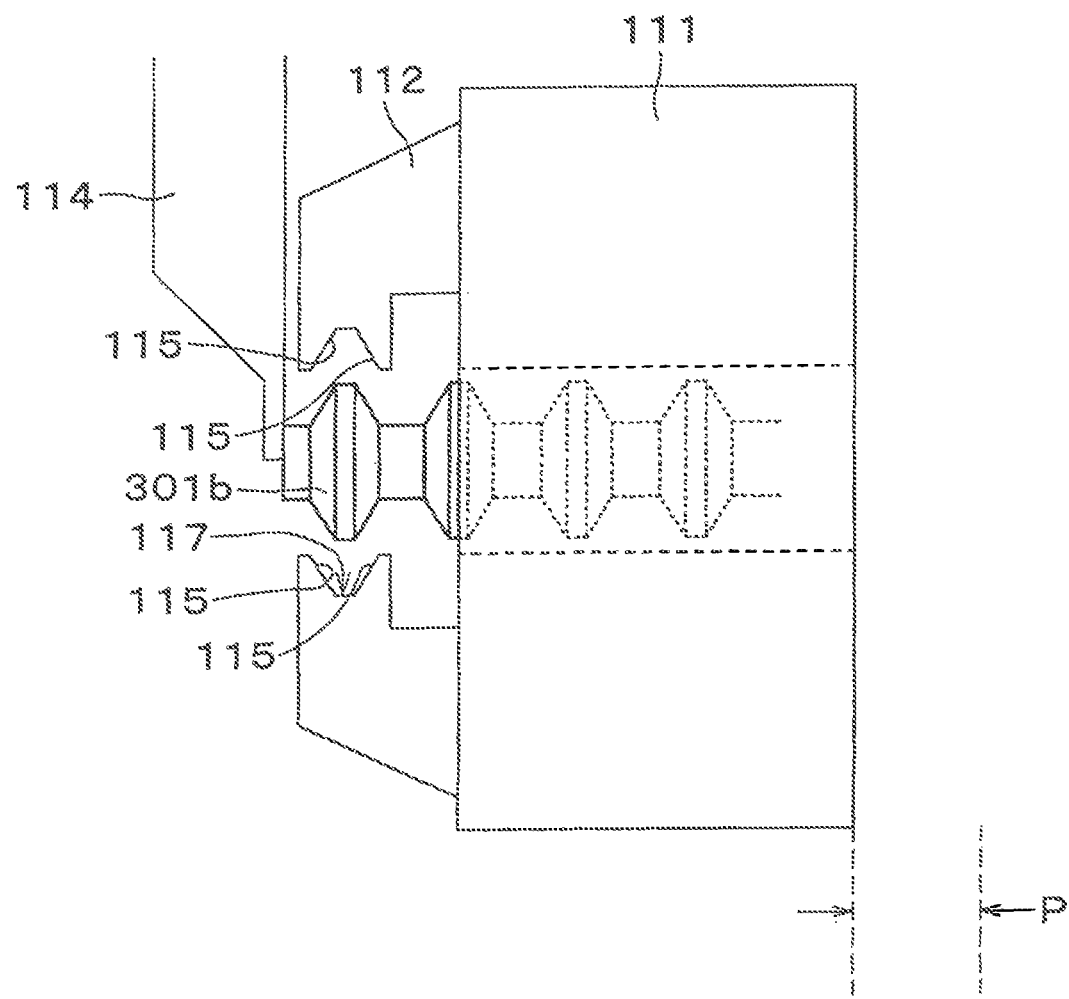
FIG. 14E is an explanatory drawing showing another step in the sequence of operation of the gripping mechanism continued from FIG. 14D.

When the spindle table 116 is positioned and fixed with respect to the slide table 121 from the condition shown in FIG. 14B, and the spindle 111 is rotated together with the gripper 112, the workplace 300 rotates on its central axis. When the material removal from the raw blank 301a by the cutting tool 113, as shown in FIG. 14C, is finished, the product 350a is separated from the workplace 300 by the separating tool 114 as shown in FIG. 14D, and the work is completed. Then, the gripper 112 is opened to release the grip on the raw blank 301b, as shown in FIG. 14E.

Figure 14F:
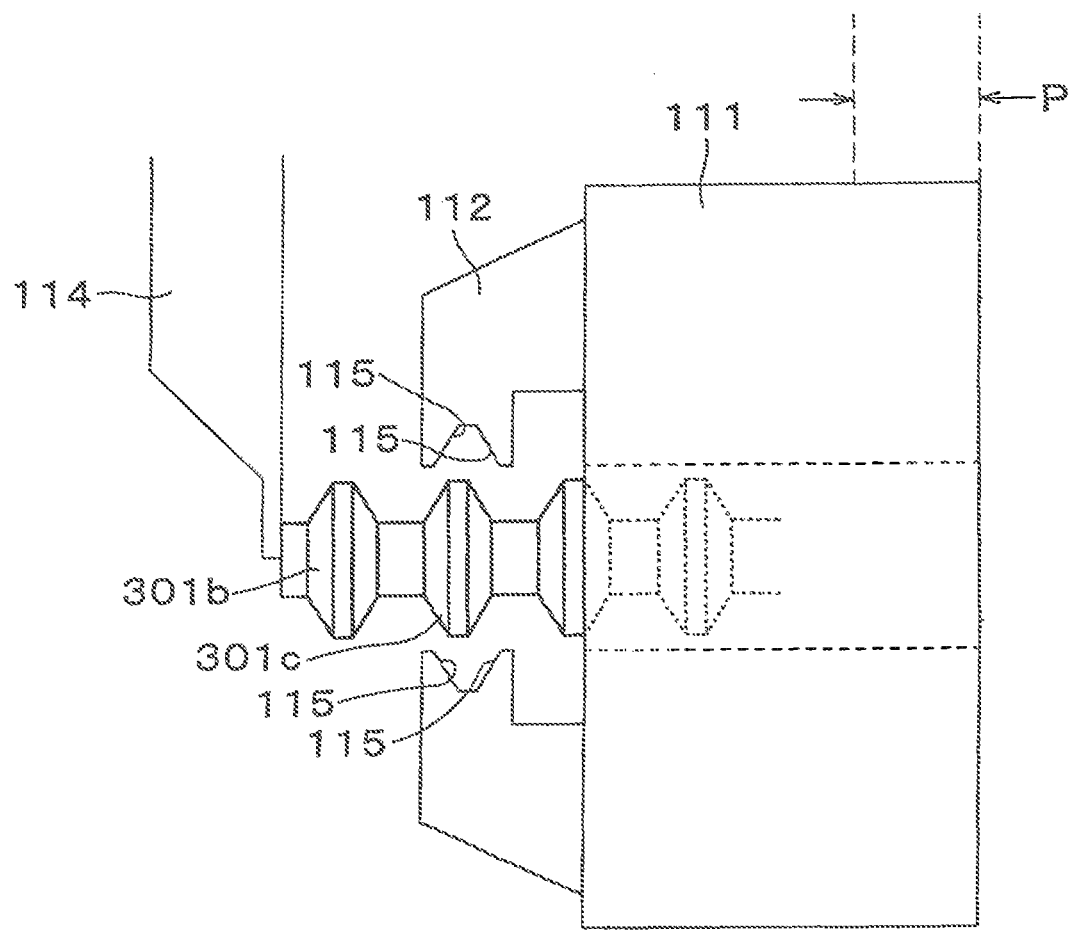
FIG. 14F is an explanatory drawing showing another step in the sequence of operation of the gripping mechanism continued from FIG. 14E.

The spindle 111 is set back by the feed moving means 130 by a distance P, corresponding to the pitch of the raw blanks 301, as shown in FIG. 14F. The fixation of the spindle table 116 by the free moving means 120 is released, the gripper 112 grips a next raw blank 301c, adjoining the raw blank 301b which is to be machined next, in a manner similar to the case shown in FIG. 14B. Thus, the next raw blank 301b can be machined.

A part of the error of the pitch of the raw blank 301 is absorbed in the working of one raw blank 301 by the movement of the spindle from the position shown in FIG. 14A to the position shown in FIG. 14B, and the raw blank 301 to be machined is positioned with respect to the spindle 111 within a range of dimension errors in pitch and shape of the gripped portion (of an adjoining raw blank 301 to be gripped), and a no dimension error is accumulated in the sequential machining of the raw blanks 301 by repetition of the above-described processes. Accordingly, it becomes possible to lessen the removable material, to reduce waste of the material, to reduce the burden of disposal of discharged chips, and to prevent unworkable parts from being generated due to the accumulation of dimensional errors.

It should be noted that the gripping mechanism can also be arranged to grip the workpiece 300 by the spindle 111 (i.e., by the gripper 112) by freely moving the workpiece 300 in the axial direction.

Figure 15:
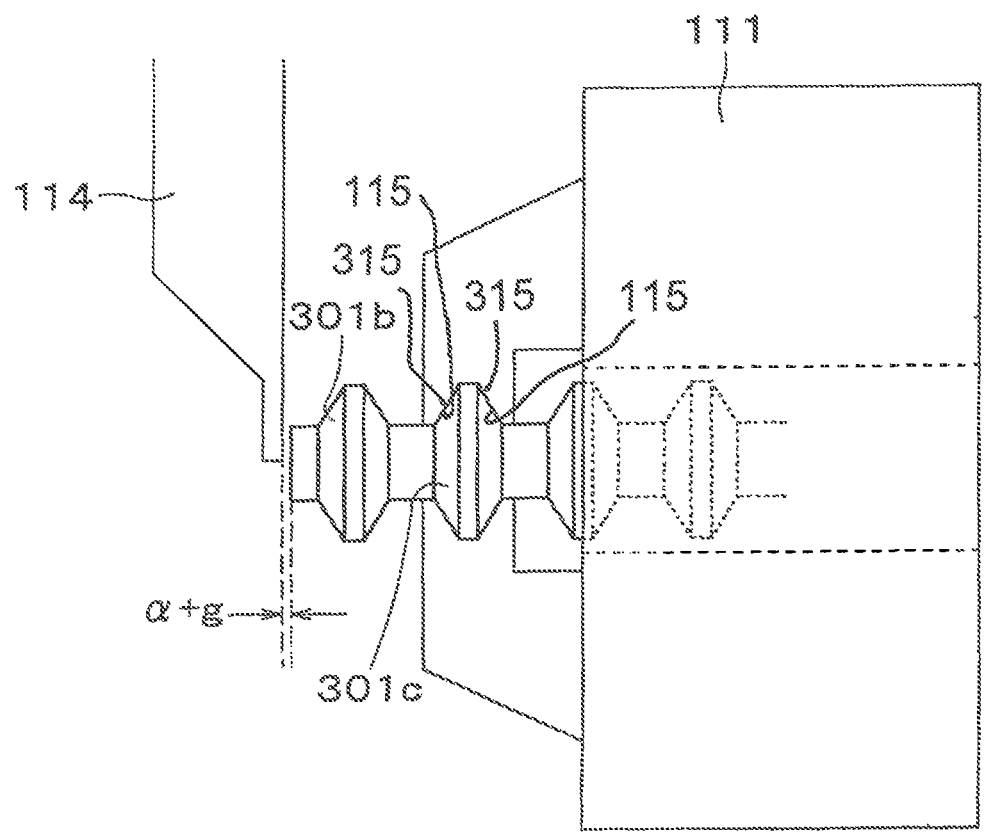
FIG. 15 is an explanatory drawing showing an operation of another example of the gripping mechanism of the invention.
Figure 16:
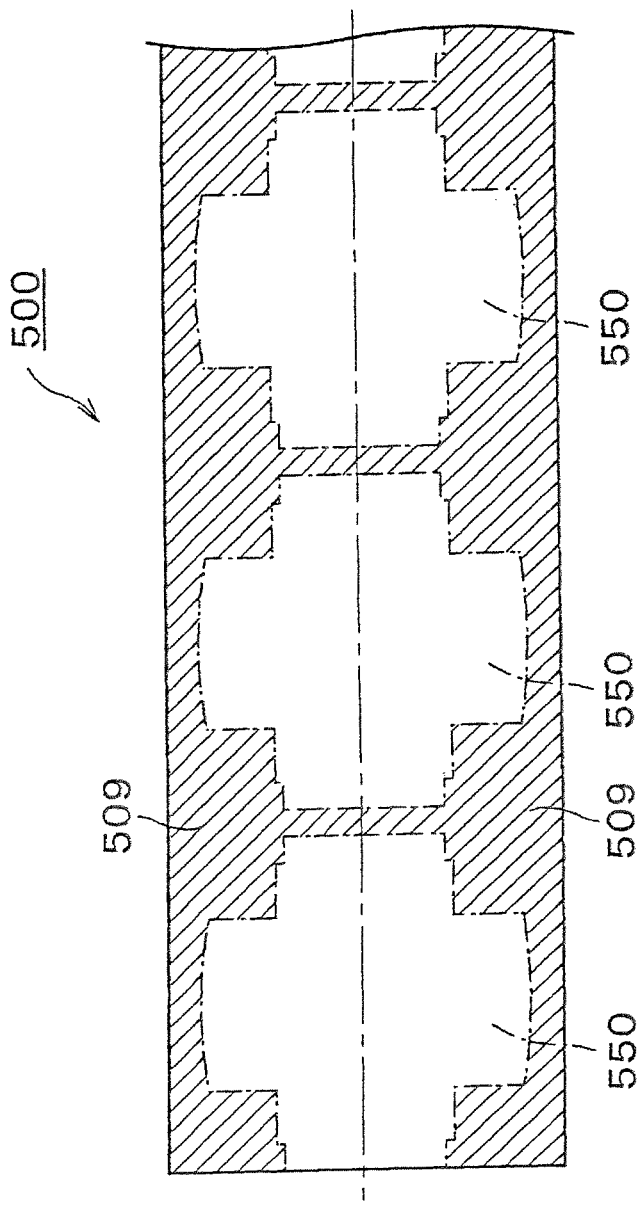
FIG. 16 is an enlarged explanatory drawing of a portion of a prior art workpiece.
Figure 17:
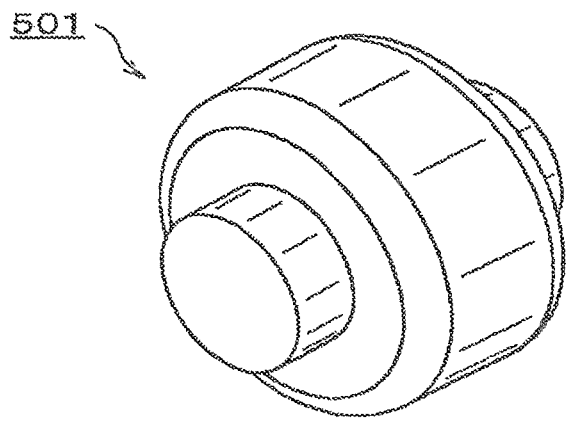
FIG. 17 is a perspective view of a prior art raw blank.

In this case, in using the gripper 122 to grip a raw blank 301c adjoining a raw blank 301b to be machined, the workpiece 300 can be moved freely by positioning and fixing the spindle table 116 with respect to the slide table 121 and by freely moving the push bar of a material feeding machine for feeding the workpiece 300 in the axial direction. Then, the workpiece 300 moves freely so that gripping surfaces 115 and 315 follow each other as shown in FIG. 15, and error in the positions of the raw blank 301c and the gripper 112 is absorbed, the relative positions of the raw blank 301c and the gripper 112 are defined, and the workpiece 300 is gripped by the spindle 111.

It should be noted that it is possible to prevent the workpiece 300 from colliding with the stop (piercing bite) in gripping the workpiece 300 by always positioning the workpiece 300 so that it is pulled toward the spindle 111 while being gripped by the gripper 112. However, by setting back the stop after positioning the workpiece the workpiece 300 can be prevented from colliding with the stop even if the workpiece is moved in the direction such that it projects out of the spindle 111 when gripped.

It should be noted that in any of the embodiments described above, the surfaces of the raw blanks and the gripping surfaces, that together compose the positioning means, can have any shape, such as one in which the raw blank is concave in cross-section and the gripping surface is convex in cross-section, contrary to the last embodiment described above, as long as the shapes define the relative axial positions of the raw blank and the spindle. To define the relative axial position of the spindle and the workpiece it is not only also possible to have tapered surfaces on both sides of both members in the axial direction as in the embodiments described above, but also to provide a tapered surface on only one of the raw blank and the gripper, or on only one of the sides of the raw blank or the gripper in the axial direction.

For instance, it becomes possible to define the relative axial positions by the gripping operation by arranging so that the gripping surface of the gripper is similar to the convex portion of the raw blanks 101 and 201 of the workpieces 100 and 200, but concave in cross-section, with the tapered surfaces on both sides thereof in the axial direction gripping the workpiece 100 of the first embodiment or the workpiece 200 of the second embodiment. The relative position in the axial direction can also be defined by a gripping surface having a shape other than a tapered surface, such as an irregular fitting shape having a less gap.

The sequential projection of raw blanks 301 to be machined out of the spindle 111, and the gripping of the raw blank 301c adjoining the raw blank 301b to be machined with movement of the spindle 111, have been explained in the embodiments described above with reference to a moving spindle type machine tool. However it should be noted that it is also possible to project raw blanks 301 to be machined sequentially out of a spindle by moving the workpiece 300 in a manner similar to the manner in which to a conventional rod member is projected in a fixed spindle type machine tool. It also becomes possible in this case to position the spindle and the workplace 300, and to grip the workplace 300 in the same manner as described above by allowing at least one of the spindle and the workplace 300 to move freely in the axial direction of the spindle in gripping the raw blank 301c adjoining the raw blank 301b to be machined.

When the workpiece 400 of the fourth embodiment is gripped by the gripping mechanism, the relative axial positions of the adjoining raw blank 401 and the spindle 111 are defined by the gripping operation of the gripping surface 115 of the gripper 112 by forming the gripping surface 115 in a convex shape in cross-section, with tapered surfaces that engage front and rear tapered surfaces 415 of the gripping boss 404 in the axial direction as shown in FIG. 6. It should be noted that the engagement surface of the gripping boss 404 and the gripping surface 115 which together compose the positioning means can have any shape as long as it defines the relative axial positions in of the adjoining raw blank and the spindle in the same manner as in the first embodiment described above.

Furthermore, the workplace 400 of the fourth embodiment can be machined without changing the gripper by unifying the shape of the gripping boss even if the workpiece has a peculiar shape or is composed of different raw blanks, so that it is possible to shorten the handling time not involved in the machining, and to shorten the overall time required to produce the plurality of products.

It should be rioted that, although the embodiment of the gripping mechanism described above has been explained by exemplifying the case of gripping the workpiece of the third embodiment, which is a rod-like workpiece in which plural raw blanks are integrated, the individual raw blanks can be supplied by a handling means. Furthermore, it is possible to drive the spindle table 116 by adopting, as a feed moving means, a linear driving means that allows drive, fixation and free movement of the spindle table 116, and is capable of controlling the position thereof, such as a linear motor-type sliding movement mechanism, and to use the feed moving means also as the free moving means by putting the feed moving means in a free movement condition.

The invention claimed is:

1. A process for producing a plurality of products from a workpiece composed of a plurality of raw blank portions integrally fixed together and aligned adjacent one another in a row extending along an axis, wherein each of said raw blank portions includes a quantity of material to be removed, said quantity of material included in each of said raw blank portions surrounding a part thereof that is to become one of said plurality of products and including a part thereof that is located radially farthest from said axis, wherein, before commencement of removal of said quantity of material from said raw blank portions of which the workpiece is composed, each of said raw blank portions has a shape that enables it to be distinguished from the workpiece as a whole, wherein said workpiece includes a plurality of grippable portions, wherein each of said raw blank portions is associated with a different one of said grippable portions, wherein said quantity of material to be removed is removed from said raw blank portions sequentially along said row by cutting, and wherein, as said quantity of material is removed from each said raw blank portion, the grippable portion associated with the raw blank portion from which material is being removed is gripped by a gripper, and after said material is removed from each said raw blank portion, said gripper is caused to release the grippable portion associated with the raw blank portion from which material was most recently removed and grips the grippable portion associated with a next adjacent raw blank portion of said workpiece.

2. The process according to claim 1, wherein the grippable portion with which each of said raw blank portions is associated is an integrally formed surface of its associated raw blank portion, said integrally formed surface being engageable by said gripper, and wherein the said integrally formed surface is gripped by said gripper during the removal of material from said associated raw blank portion.

3. The process according to claim 1, wherein said raw blank portions are integrally molded as a unit, and margins of separation are provided between adjacent raw blank portions in said row.

4. The process according to claim 1, wherein each of said raw blank portions has a through hole and is integrally fixed to a rod that extends through the through hole.

5. The process according to claim 1, wherein said raw blank portions include raw blank portions having different shapes, for producing products having different shapes.

6. The process according to claim 1, wherein each of said raw blank portions is integrally formed with a grippable portion engageable by said gripper for holding said workpiece against movement along said axis.

7. The process according to claim 6, wherein each said grippable portion is a surface of one of said raw blank portions.

8. The process according to claim 6, wherein the integrally formed grippable portion of at least all but one of said raw blank portions of the workpiece is a surface of a separating part connecting two adjacent raw blank portions in the workpiece.

9. The process according to claim 6, wherein each of said grippable portions is composed of concave and convex parts.

10. The process according to claim 7, wherein each of said integrally formed grippable portions is a surface tapered in the direction of said axis.

11. The process according to claim 1, wherein the removal of material from each of said raw blank portions is followed by separation of the raw blank portion from which material has been removed from said workpiece before removal of material from any next succeeding raw blank portion along said row in the workpiece.

12. A process for producing a plurality of products from a workpiece composed of a plurality of raw blank portions integrally fixed together and aligned adjacent one another in a row extending along a axis, wherein each of said raw blank portions includes a quantity of material to be removed, said quantity of material included in each of said raw blank portions surrounding a part thereof that is to become one of said plurality of products and including a part thereof that is located radially farthest from said axis, wherein, before commencement of removal of said quantity of material from said raw blank portions of which the workpiece is composed, each of said raw blank portions has a shape that enables it to be distinguished from the workpiece as a whole, wherein said workpiece includes a plurality of grippable portions, wherein each of said raw blank portions is associated with a different one of said grippable portions, wherein said quantity of material is removed from each of said raw blank portions, wherein each of said raw blank portions is integrally formed with a different associated grippable portion engageable by a gripper for holding said workpiece against movement along said axis, wherein the integrally formed grippable portion of at least all but one of said raw blank portions of the workpiece is a surface of a separating part connecting two adjacent raw blank portions in the workpiece, and wherein, while said material is being removed from each of said raw blank portions, the grippable portion with which said raw blank portion from which material is being removed is associated is engaged and gripped by said gripper.

13. A process for producing a plurality of products from a workpiece composed of a plurality of raw blank portions integrally fixed together and aligned adjacent one another in a row extending along a axis, wherein each of said raw blank portions includes a quantity of material to be removed, said quantity of material included in each of said raw blank portions surrounding a part thereof that is to become one of said plurality of products and including a part thereof that is located radially farthest from said axis, wherein, before commencement of removal of said quantity of material from said raw blank portions of which the workpiece is composed, each of said raw blank portions has a shape that enables it to be distinguished from the workpiece as a whole, wherein said workpiece includes a plurality of qrippable portions, wherein each of said raw blank portions is associated with a different one of said grippable portions, wherein said quantity of material is removed from each of said raw blank portions, wherein each of said raw blank portions is integrally formed with a different associated grippable portion engageable by a gripper for holding said workpiece against movement along said axis, wherein each said grippable portion is composed of concave and convex parts, and wherein, while said material is being removed from each of said raw blank portions, the grippable portion with which said raw blank portion from which material is being removed is associated is engaged and gripped by a said gripper.

14. A process for producing a plurality of products from a workpiece composed of a plurality of raw blank portions integrally fixed together and aligned adjacent one another in a row extending along a axis, wherein each of said raw blank portions includes a quantity of material to be removed, said quantity of material included in each of said raw blank portions surrounding a part thereof that is to become one of said plurality of products and including a part thereof that is located radially farthest from said axis, wherein, before commencement of removal of said quantity of material from said raw blank portions of which the workpiece is composed, each of said raw blank portions has a shape that enables it to be distinguished from the workpiece as a whole, wherein said workpiece includes a plurality of qrippable portions, wherein each of said raw blank portions is associated with a different one of said grippable portions, wherein said quantity of material is removed from each of said raw blank portions, wherein each of said raw blank portions is integrally formed with a different associated grippable portion engageable by a gripper for holding said workpiece against movement along said axis, wherein each said grippable portion is a surface tapered in the direction of said axis, and wherein, while said material is being removed from each of said raw blank portions, the grippable portion with which said raw blank portion from which material is being removed is associated is engaged and gripped by said gripper.

* * * * *